US010496916B1

(12) United States Patent
Cowan

(10) Patent No.: US 10,496,916 B1
(45) Date of Patent: Dec. 3, 2019

(54) SCREEN PROTECTOR ARTICLE WITH IDENTIFICATION FUNCTIONALITY

(71) Applicant: Randy G. Cowan, Sioux Falls, SD (US)

(72) Inventor: Randy G. Cowan, Sioux Falls, SD (US)

( * ) Notice: Subject to any disclaimer, the term of this patent is extended or adjusted under 35 U.S.C. 154(b) by 0 days.

(21) Appl. No.: 15/851,848

(22) Filed: Dec. 22, 2017

(51) Int. Cl.
*G06K 19/02* (2006.01)
*G06K 19/077* (2006.01)

(52) U.S. Cl.
CPC . *G06K 19/07722* (2013.01); *G06K 19/07728* (2013.01); *G06K 19/07749* (2013.01); *G06K 19/07745* (2013.01)

(58) Field of Classification Search
CPC .......... G06K 19/077; G06K 19/07745; G06K 19/07722
USPC ...................................................... 235/488
See application file for complete search history.

(56) References Cited

U.S. PATENT DOCUMENTS

| | | | |
|---|---|---|---|
| 5,528,222 A | 6/1996 | Moskowitz | |
| 5,909,176 A | 6/1999 | Schrott | |
| 6,107,920 A | 8/2000 | Eberhardt | |
| 6,816,083 B2 | 11/2004 | Brandt | |
| 7,158,031 B2 | 1/2007 | Tuttle | |
| D538,806 S | 3/2007 | Brod | |
| 7,259,678 B2 | 8/2007 | Brown | |
| 8,044,942 B1* | 10/2011 | Leonhard | G06F 1/1637 345/173 |
| RE43,415 E | 5/2012 | Tuttle | |
| 8,319,611 B2 | 11/2012 | Tsukamoto | |
| 2007/0195003 A1 | 8/2007 | Deavours | |
| 2011/0095090 A1 | 4/2011 | Tracy | |
| 2011/0309608 A1* | 12/2011 | Flynn | G06F 1/1656 283/70 |
| 2015/0186768 A1* | 7/2015 | Peters | G06K 19/07773 235/488 |
| 2017/0212051 A1* | 7/2017 | De Lacerda | G01N 21/6447 |
| 2017/0354143 A1* | 12/2017 | Rolfe | A01N 25/28 |
| 2018/0246617 A1* | 8/2018 | Morrison | G06F 3/0412 |

FOREIGN PATENT DOCUMENTS

WO  0021032  4/2000

* cited by examiner

*Primary Examiner* — Ahshik Kim
(74) *Attorney, Agent, or Firm* — Jeffrey A. Proehl; Woods, Fuller, Shultz & Smith, PC

(57) ABSTRACT

An article for protecting a display screen of an electronic device, with the display screen having a display surface. The article may include a substrate configured to be applied to the display surface of the display screen of the device. The substrate may be substantially transparent to permit viewing of portions of the display screen through the substrate. The substrate may have an outer surface for facing outwardly from the display surface when the substrate is applied to the display surface, and an inner surface for facing toward the display surface when the substrate is applied to the display surface. The article may also include an identification circuit integrated with the substrate and encoding an identification code. The article may further include a layer of adhering substance applied to at least a portion of the inner surface of the substrate.

13 Claims, 2 Drawing Sheets

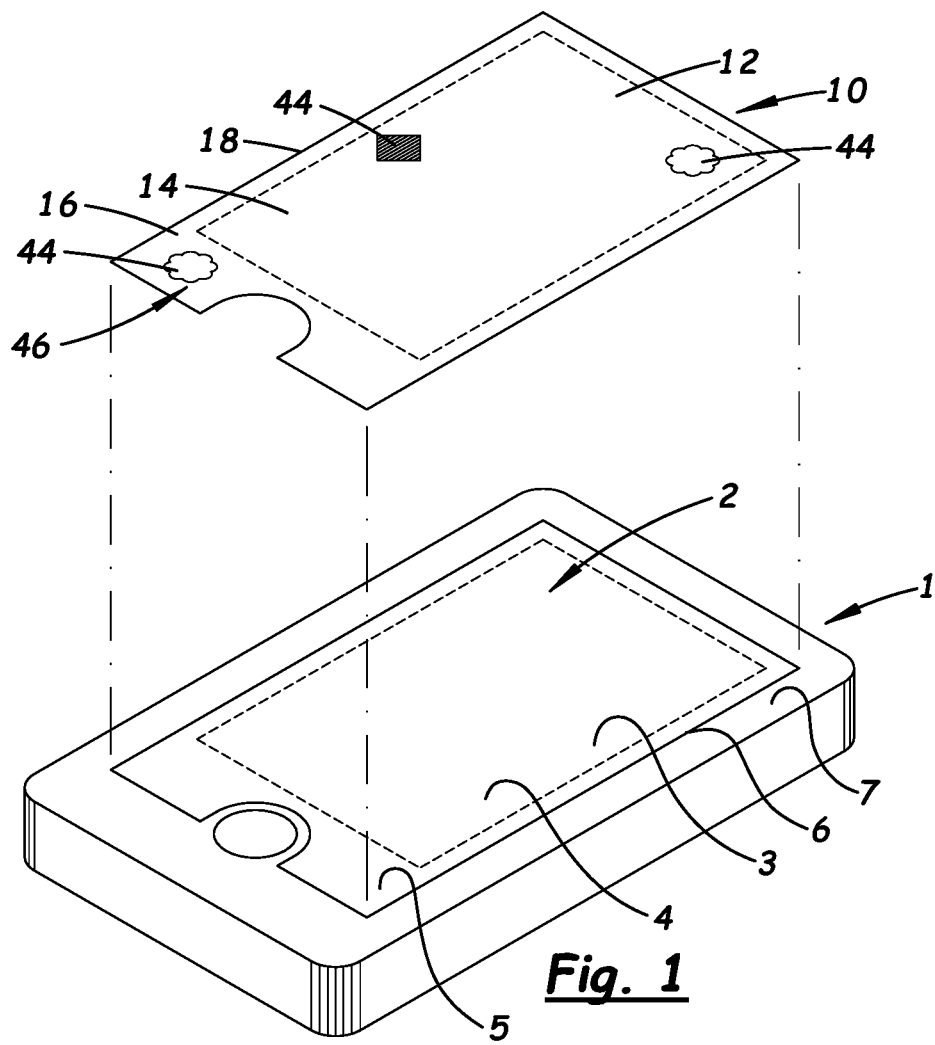
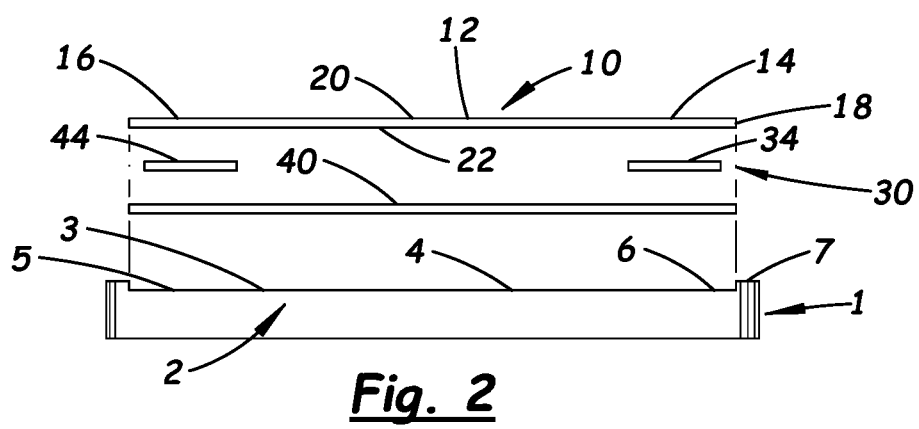

SCREEN PROTECTOR ARTICLE WITH IDENTIFICATION FUNCTIONALITY

BACKGROUND

Field

The present disclosure relates to screen protectors and more particularly pertains to a new screen protector article with identification functionality for communicating information wirelessly from the article.

SUMMARY

In one aspect, the present disclosure relates to an article for protecting a display screen of an electronic device, with the display screen having a display surface. The article may include a substrate configured to be applied to the display surface of the display screen of the device. The substrate may be substantially transparent to permit viewing of portions of the display screen through the substrate. The substrate may have an outer surface for facing outwardly from the display surface when the substrate is applied to the display surface, and the substrate may have an inner surface for facing toward the display surface when the substrate is applied to the display surface. The article may include an identification circuit integrated with the substrate, with the identification circuit encoding an identification code. The article may comprise a layer of adhering substance applied to at least a portion of the inner surface of the substrate.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components, and the particulars of the steps, set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein:

FIG. 1 is a schematic perspective view of a new screen protector article with identification functionality according to the present disclosure, shown in exploded relationship to an electronic device.

FIG. 2 is a schematic side view of the screen protector article shown in exploded relationship to an electronic device, according to an illustrative embodiment.

DETAILED DESCRIPTION

Figure 3:
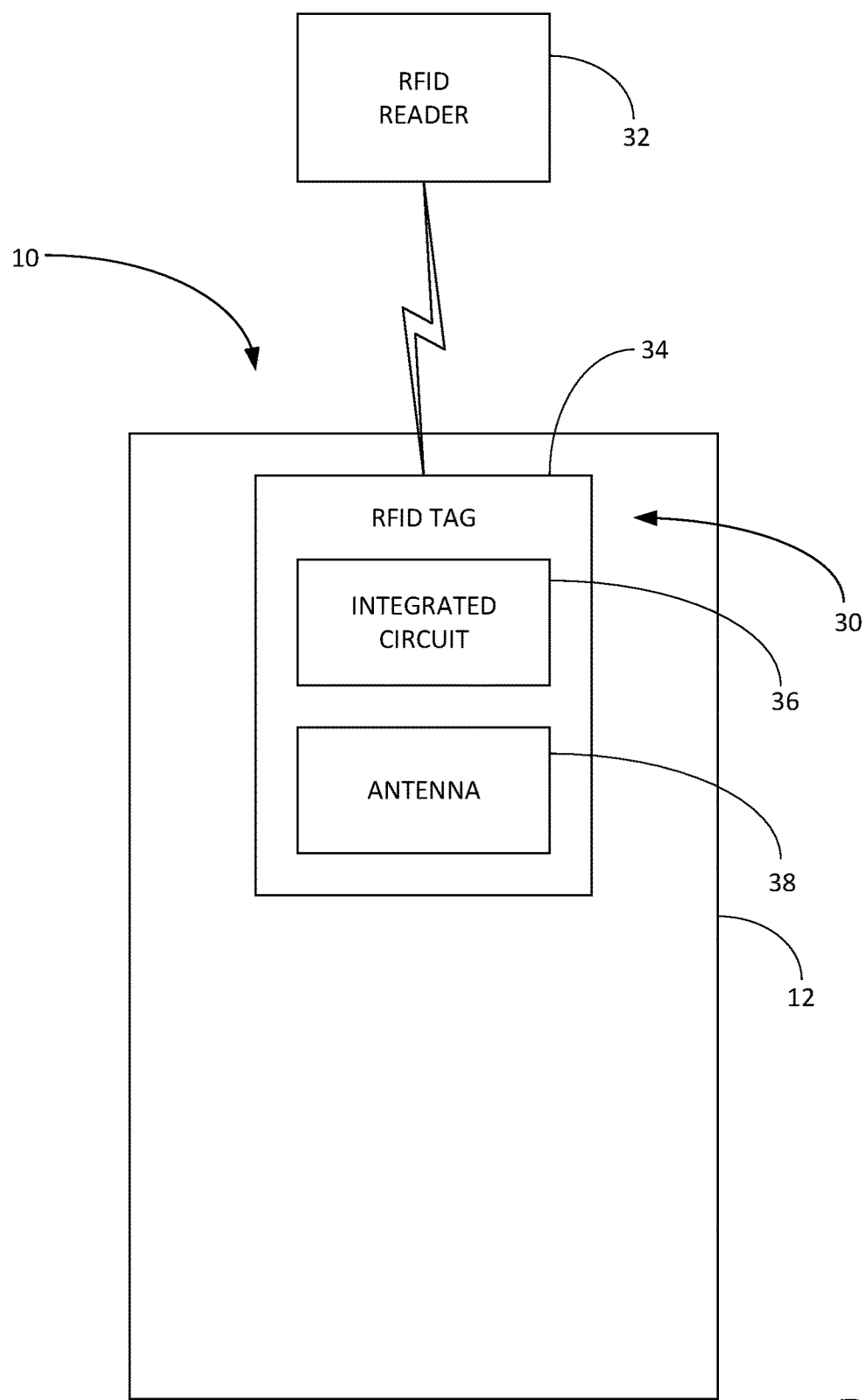
FIG. 3 is a schematic block diagram of the screen protector article, according to an illustrative embodiment.

With reference now to the drawings, and in particular to FIGS. 1 through 3 thereof, a new screen protector article with identification functionality embodying the principles and concepts of the disclosed subject matter will be described.

In one aspect, the disclosure relates to an article 10 for application to a display screen 2 of an electronic communication device 1. The display screen 2 of the device 1 may have a display surface 3 which may have various areas or zones, such as, for example, a display zone 4 capable of displaying a changeable image on the display screen generated by circuitry of the device 1, and a non-display zone 5 which may be incapable of displaying a changeable image on the display screen, and may be located toward a peripheral portion of the careen. The display zone 4 of the display surface may be illuminable by a source of illumination or light of the display screen which is positioned within the device behind or to the rear of the screen 2. The display screen may have a periphery 6 and in some implementations the device may also have a frame 7 which extends about the periphery of the display screen.

One function of the article 10 may be to provide a degree of protection to the display screen 2, and more particularly the display surface 3 of the screen 2, against various types of damage to the surface 3 caused by objects coming into direct contact with the surface 3. The article 10 may have functions or purposes other than protective, such as decorative. Advantageously, the article 10 may also have the additional ability to communicate information from the article in a wireless manner which may be useful for communicating information about the article, the device with which the article is associated, and/or the person with which the device and article is associated.

The article 10 may include a substrate 12 which is configured to cover at least a portion of the display screen of the device 1. In some embodiments, the substrate 12 may cover substantially the entirety of the display surface of the screen 2, and may have a size and shape configured to cover substantially the entirety of the display surface. Accordingly, the size and shape of the substrate may be configured specifically for a particular brand or model of device. The substrate 12 may be substantially transparent, although some degree of opaqueness may be utilized. The substrate 12 may have a display region 14 which is configured to cover the display zone 4 of the display screen when the substrate is applied to the display surface of the screen 2. The substrate may also have a non-display region 16 which is configured to cover the non-display zone 5 of the screen when the substrate is applied to the surface 3 of the screen.

The substrate 12 has a perimeter 18 which may generally be of a size and shape that corresponds to the periphery 6 of the display screen 2 and may meet or abut against the frame 7 of the device 1 extending about the screen 2. The substrate 12 may have an outer surface 24 facing outwardly from the display surface 3 when the substrate is applied to the display screen, and may also have an inner surface 22 for facing toward the display surface when the substrate is applied to the screen 2. The substrate 12 may be substantially uniformly thick so that the inner 22 and outer 24 surfaces are substantially parallel to each other. The substrate 12 may also be formed of a flexible material so that the substrate 12 is flexible to facilitate, for example, rolling the substrate out onto the display surface as well as peeling the substrate off of the display surface.

The article 10 may also include an identification circuit 30 which is associated with the substrate 12, and may be integrated with the substrate. The identification circuit 30 may be inseparably integrated with the substrate 12, and such inseparability may be characterized in that removal of the circuit 30 from the substrate may require substantial damage to or destruction of the substrate. In some embodiments, the identification circuit 30 may be positioned adjacent to the inner surface 22 of the substrate, which may position the identification circuit adjacent to the display surface when the substrate is applied to the display screen of a device. In other embodiments, the circuit 30 may be positioned adjacent to the outer surface 20 of the substrate. The identification circuit 30 may be relatively thin having a thickness comparable to the thickness of the substrate, although the thickness of the circuit may be somewhat greater than the substrate.

The identification circuit 30 may utilize radio frequency (RF) energy for wireless communication with another device designed for communication with or interrogating RF circuits. The circuit 30 may receive the RF energy from an interrogating RF source to cause stimulation or energization of the circuit 30 which in turn permits the circuit to transmit information via RF energy. The identification circuit 30 may comprise a radio frequency identification (RFID) tag, and the tag may have an identification code, such as, for example, an identification number. In some embodiments, the code is preassigned to the tag, such as prior to association with the substrate, or may be assigned after the tag is associated with the substrate utilizing read/write circuitry.

The RFID tag may comprise an inlay with a thin thickness suitable for application to the substrate. The tag may include suitable circuitry, such as an integrated circuit, and an antenna for receiving the energizing power and retransmitting a portion of the received power with the identification code or other information. Suitably, the tag may be of the dry inlay type, although other types may be utilized. The tag may be located on the substrate in the display region or the non-display region.

The article 10 may also include means for adhering the substrate to the display screen 2 of the device 1, preferably in a temporary manner. Suitably, the adhering means may comprise a layer 40 of adhering substance applied to at least a portion of the inner surface 22 of the substrate, and in some embodiments the layer 40 may be continuous and uninterrupted between the portions of the perimeter 18 of the substrate. The least a portion of the adhesive layer 40 may be applied over the marked area 46 of the substrate. The adhering substance may be characterized by producing a low level of adhesion permitting peeling removal of the substrate from the display surface of the screen using finger-applied pulling force, while still resisting unintentional and inadvertent removal of the substrate from the screen.

In some embodiments of the article 10, a marking 44 or markings may be marked upon one of the surfaces of the substrate, such as by printing or other suitable technique for placing a mark upon the substrate. The marking 44 may be located on the inner surface 22 of the substrate, and/or may be located on the outer surface 20 of the substrate. In some embodiments, the marking 44 may be located in the non-display region 16.

The marking may be of a character that is opaque to visible light transmitted from the display screen, and the marking may block the transmission of the visible light from the display surface. The marking may be of a character that permits partial transmission of visible light from the display surface such that the marking is partially transparent. The marking 44 may be of a character or density that blocks vision through the marking to the display surface when the display surface is not illuminated by the source of illumination for the display screen, and thus allows the passage of visible light through the marking from the source of illumination behind the display surface. In some embodiments, the marking may be formed by an ink printed on one of the surfaces of the substrate, and in embodiments the marking is formed by a toner printed on one of the surfaces of the substrate. In some of body mints, the barking 44 may be formed by etching one of the surfaces of the substrate, and in embodiments the marking is formed by embossing one of the surfaces of the substrate. In some embodiments, the marking may have a color, and in embodiments the marking may be reflective of light striking the substrate.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. An article for protecting a display screen of an electronic device, the display screen having a display surface, the article comprising:

a substrate configured to be applied to the display surface of the display screen of the device, the substrate being substantially transparent to permit viewing of portions of the display screen through the substrate, the substrate having an outer surface for facing outwardly from the display surface when the substrate is applied to the display surface, the substrate having an inner surface for facing toward the display surface when the substrate is applied to the display surface;

an identification circuit integrated with the substrate, the identification circuit encoding an identification code;

a layer of adhering substance applied to at least a portion of the inner surface of the substrate; and a marking printed on the substrate.

2. The article of claim 1 wherein the identification circuit is configured to passively retransmit energy received from a reader device.

3. The article of claim 1 wherein the identification circuit is a radio frequency identification device (RFID) tag.

4. The article of claim 3 wherein the RFID tag includes an integrated circuit and an antenna.

5. The article of claim 3 wherein the RFID tag is configured to respond to a radio-frequency identification reader device.

6. The article of claim 1 wherein the identification circuit is inseparably integrated with the substrate.

7. The article of claim 1 wherein the identification circuit is positioned adjacent to the inner surface of the substrate.

8. The article of claim 1 wherein the identification circuit is positioned adjacent to the outer surface of the substrate.

9. The article of claim 1 wherein the substrate has a perimeter, and the layer of adhering substance is continuous between portions of the perimeter of the substrate.

10. The article of claim 1 wherein the layer of adhering substance is characterized by producing a low level of adhesion permitting peeling removal of the substrate from the display surface using finger-applied pulling force.

11. An article for protecting a display screen of an electronic device, the display screen having a display surface, the article comprising:

a substrate configured to be applied to the display surface of the display screen of the device, the substrate being substantially transparent to permit viewing of portions of the display screen through the substrate, the substrate having an outer surface for facing outwardly from the display surface when the substrate is applied to the display surface, the substrate having an inner surface for facing toward the display surface when the substrate is applied to the display surface;

an identification circuit integrated with the substrate, the identification circuit encoding an identification code; and a layer of adhering substance applied to at least a portion of the inner surface of the substrate;

a marking marked on the substrate;

wherein the marking is located on the inner surface of the substrate.

12. An article for protecting a display screen of an electronic device, the display screen having a display surface, the article comprising:

a substrate configured to be applied to the display surface of the display screen of the device, the substrate being substantially transparent to permit viewing of portions of the display screen through the substrate, the substrate having an outer surface for facing outwardly from the display surface when the substrate is applied to the display surface, the substrate having an inner surface for facing toward the display surface when the substrate is applied to the display surface;

an identification circuit integrated with the substrate, the identification circuit encoding an identification code; and a layer of adhering substance applied to at least a portion of the inner surface of the substrate;

a marking marked on the substrate;

wherein the marking being located on the outer surface of the substrate, the marking being located in the non-display region of the substrate.

13. An article for protecting a display screen of an electronic device, the display screen having a display surface, the article comprising:

a substrate configured to be applied to the display surface of the display screen of the device, the substrate being substantially transparent to permit viewing of portions of the display screen through the substrate, the substrate having an outer surface for facing outwardly from the display surface when the substrate is applied to the display surface, the substrate having an inner surface for facing toward the display surface when the substrate is applied to the display surface;

an identification circuit integrated with the substrate, the identification circuit encoding an identification code; and a layer of adhering substance applied to at least a portion of the inner surface of the substrate;

a marking marked on the substrate;

wherein the substrate has a display region configured to cover a display zone of the screen when the substrate is applied to the screen and a non-display region configured to cover a non-display zone of the screen when the substrate is applied to the screen; and wherein the marking being located in the display region of the substrate, the marking being located on a marked area of the substrate, the marking being located on a plurality of marked areas of the substrate.

* * * * *